United States Patent [19]
Liberman

[11] 3,808,583
[45] Apr. 30, 1974

[54] POWER JUNCTION
[76] Inventor: Milton Liberman, 65 Seawane Rd., East Rockaway, N.Y. 11518
[22] Filed: Oct. 27, 1971
[21] Appl. No.: 192,914

[52] U.S. Cl............................ 339/103 R, 339/196 A
[51] Int. Cl............................................. H01r 13/58
[58] Field of Search............ 339/18 P, 31, 103, 136, 339/184, 185, 196, 206, 208, 176 M

[56] References Cited
UNITED STATES PATENTS

| | | | |
|---|---|---|---|
| 1,678,467 | 7/1928 | Hebb | 339/196 R X |
| 2,739,293 | 3/1956 | Alden | 339/196 M |
| 3,380,015 | 4/1968 | Gaines et al. | 339/196 M X |
| 2,122,819 | 7/1938 | Lazich | 339/185 R X |
| 2,553,681 | 5/1951 | Schmier | 339/103 C |
| 3,362,006 | 1/1968 | Fuller | 339/103 C X |
| 1,979,958 | 11/1934 | Clark, Jr. | 339/206 P |
| 2,425,679 | 8/1947 | Jackson | 339/185 R X |
| 3,317,880 | 5/1967 | Meyer | 339/31 R |

Primary Examiner—Richard E. Moore

[57] ABSTRACT

A power junction having a single open ended housing and a plate removably closing said open end, said plate carrying rigid prongs for cooperation with an electric outlet and said housing having a cable connector attached thereto, said connector being angularly adjustable relative to said plate.

4 Claims, 5 Drawing Figures

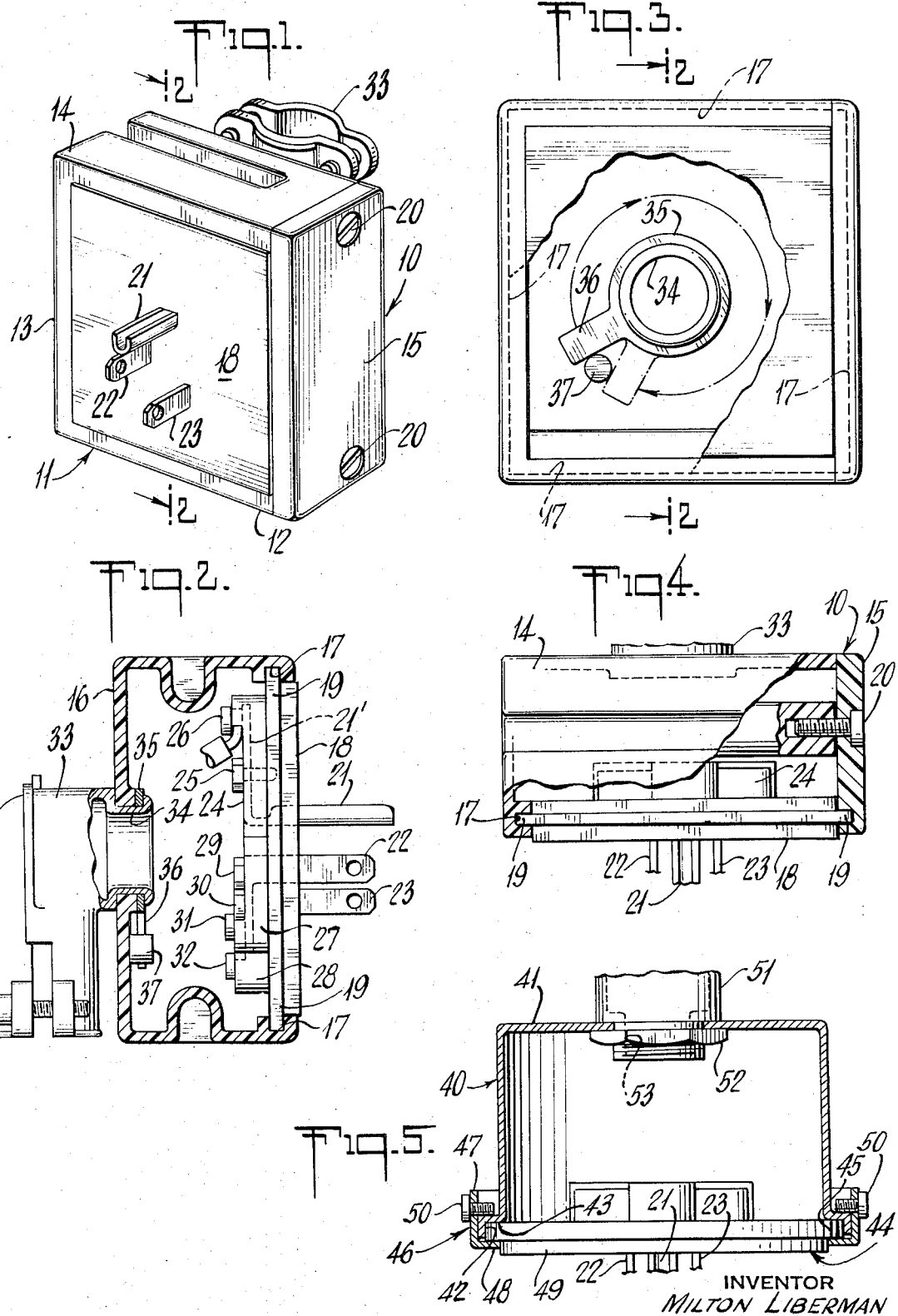
PATENTED APR 30 1974          3,808,583
INVENTOR
MILTON LIBERMAN
BY
ATTORNEY

POWER JUNCTION

This invention relates to power junctions for supplying power to electrical equipment and more specifically to a novel and improved power junction useful among other things for connecting recessed lighting fixtures to power outlets positioned within the ceiling structure supporting such recessed fixtures.

The installation of lighting fixtures in so-called drop ceilings involves the provision of electric junction boxes at or near the proposed positions of lighting fixtures to be installed in the drop ceiling and upon installation of the ceiling suitable armored cable is used to connect the fixture to the outlet box. The procedure is expensive and time consuming and consequently adds materially to the cost since all of the wiring must be accomplished at the installation site.

The power junction in accordance with the invention is particularly useful with ceiling installations wherein a plurality of spaced outlets are provided above the ceiling. With such an arrangement each recessed lighting fixture may be prewired with a power junction so that upon installation of the fixture it need only be plugged into an adjoining outlet. Moreover, the improved power connector includes means for shifting the orientation of the cable, connecting the junction to the fixture, relative to the prongs to avoid the need for bending the cable sharply.

Another object of the invention resides in the provision of a novel and improved power junction that is capable of handling power requirements for both fluorescent and incandescent lighting fixtures in both residential and commercial installations and which is characterized by its ease of installation, dependability, and relatively low cost.

Still, another object of the invention resides in the provision of a novel and improved power junction having connecting prong arrangements for different voltages and thereby avoid possible damage to a lighting fixture by preventing the accidental insertion of the junction in an outlet having a voltage other than the voltage for which the fixture was designed.

The above and other objects and advantages will become more apparent from the following description and accompanying drawings forming part of this application.

FIG. 1 is a perspective view of one embodiment of a power junction in accordance with the invention.

FIG. 2 is a cross-sectional view of FIG. 1 taken along the line 2—2 thereof.

FIG. 3 is a front view of the junction of FIGS. 1 and 2 with portions broken away.

FIG. 4 is a side elevational view of the junction shown in FIG. 1 with portions broken away.

FIG. 5 is a cross-sectional view of a modified embodiment of a power junction in accordance with the invention.

Referring now to the drawings, and more specifically to FIGS. 1 through 4 thereof, the power junction 10 includes an essentially rectangular housing 11 of insulating material having side walls 12, 13, 14 and 15 and rear wall 16. The edge of each of the side walls has a longitudinal groove 17 to slidably receive a plate 18 of insulating material and having a peripheral ridge 19. By making the housing 11 and plate 18 square, then by removal of the side wall 15 which is secured to the housing 11 by screws 20, the plate 18 can be positioned in any one of four different orientations. The plate 18 is provided with three openings to accommodate a ground terminal 21 and two power carrying terminals 22 and 23. The ground terminal 21 has an angularly formed flat portion 21' secured in a channel formed within a block 24 integrally molded with the plate 18. The flat portion 21' is held in position by a screw 25 and has a connector screw 26. The prongs 22 and 23 are similarly secured in channels formed in blocks 27 and 28 by screws 29 and 30 and are provided with terminal screws 31 and 32.

It will be observed that the prongs 22 and 23 are parallel one to the other with the terminal 23 positioned in advance of the terminal 22. This prong arrangement is for 120 volts a.c.. A higher voltage, namely, 277 volts a.c. is also used for lighting and other purposes, and in order to avoid accidental insertion of a power junction in the wrong cooperating receptacle, the arrangement of the prongs 22 and 23 is modified. This modification involves placement of the terminal 22 in advance of terminal 23 so that with the ground terminal 21 remaining in the same position, complete safety is afforded.

The rear wall 16 of the housing 11 includes a cable connector such as the angle connector 33 illustrated. The connector is provided with a shank 34 extending through the wall 16 and fixedly engages a ring 35 having an arm 36 extending therefrom. It is preferable that the shank 34 forms a relatively tight frictional fit with its cooperating opening and a boss 37 on the rear wall 16 limits rotation of the connector to an angle slightly under 360°.

A modified embodiment of the invention is shown in FIG. 5. In this embodiment the housing 40 is cylindrical and is provided with a rear wall 41 and a narrow portion 42 of enlarged diameter and forming an annular shoulder 43. The insulating plate 44 is circular and has a peripheral ridge 45 engaging the offset portion 42. The ridge 45 has a width at least equal to the width of the portion 42 and preferably slightly larger. An L-shaped ring 46 has a cylindrical leg 47 engaging the outer surface of the enlarged portion 42 and an inwardly formed leg 48 having an inside diameter slightly greater than the diameter of the downwardly extending portion 49 of plate 44 to provide a sliding fit. A pair of screws 50 threadably engaging the leg 47 of ring 46 secure the assembly in tight engagement and against rotation. The arrangement and support of the prongs 21, 22 and 23 is identical to the form of the invention shown in FIGS. 1 to 4. The rear wall 41 includes a cable connector 51, similar to the connector 33 of FIG. 4, which is secured in position by a nut threadably engaging the shank 53 to fixedly secure it in position.

With both forms of the invention described above, any desired position of the connector relative to the prongs may be attained to facilitate attachment of a fixture to an outlet and a dependable high power capacity connection is made to the cooperating outlet. Although the power junction is particularly useful for connection of lighting fixtures, it is equally useful with other devices such as heaters, ventilating fans, and the like.

While only certain embodiments of the invention have been illustrated and described, it is understood that alterations, changes and modifications may be made without departing from the spirit and scope of the invention as defined by the appended claims.

What is claimed is:

1. A power junction for feeding power to an electrically operated device comprising a polygonal housing having an open end, a polygonal plate, means on said housing removably receiving and retaining said plate in any one of a plurality of positions, at least two rigid prongs extending from the surface of said plate, and an electric cable connector secured to said housing, said connector mechanically securing an electric cable with the conductors in said cable extending into said housing for connection to said prongs, said housing being cylindrical and including a rear wall and a channel adjoining said open end, said connector being carried by said rear wall and said plate being rotatably carried in said channel.

2. A power junction for feeding power to an electrically operated device comprising a housing having an open end, an angularly adjustable plate closing said housing, at least two rigid prongs extending from the surface of said plate, and an electric cable connector secured to said housing, said connector mechanically securing an electric cable with the conductors in said cable extending into said housing for connection to said prongs, wherein said housing is square and has a removable side wall, the housing walls adjoining said open end having an internal groove and said plate having a peripheral ridge whereby removal of said removable side wall permits installation of said plate in any one of four positions.

3. A power junction according to claim 2 wherein said rigid prongs are positioned in parallel echeloned arrangement with one prong displaced forwardly of the other prong.

4. A power junction for feeding power to an electrically operated device comprising a polygonal housing having an open end, a polygonal plate, means on said housing removably receiving and retaining said plate in any one of a plurality of positions, at least two rigid prongs, extending from the surface of said plate, and an electric cable connector secured to said housing, said connector mechanically securing an electric cable with the conductors in said cable extending into said housing for connection to said prongs, said houring having a rear wall opposing said plate, said cable connector being rotatably carried by said rear wall, said housing wall adjoining said open end including a narrow portion of enlarged diameter, said plate being rotatably carried within said enlarged narrow portion and an L-shaped ring surrounding said enlarged portion and overlying the edge of said plate and means securing the latter in position on said housing.

* * * * *